(12) United States Patent
Fan (10) Patent No.: US 12,430,219 B2
(45) Date of Patent: Sep. 30, 2025

(54) INTELLIGENT SCORE BASED OOM TEST BASELINE MECHANISM

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/223,627

(22) Filed: Jul. 19, 2023

(65) Prior Publication Data

US 2024/0126667 A1 Apr. 18, 2024

(30) Foreign Application Priority Data

Oct. 18, 2022 (CN) .......................... 202211277894.X (51) Int. Cl.
*G06F 11/22* (2006.01)
*G06F 11/273* (2006.01)

(52) U.S. Cl.
CPC ...... *G06F 11/2733* (2013.01); *G06F 11/2257* (2013.01)

(58) Field of Classification Search
CPC ............. G06F 11/2257; G06F 11/2733; G06F 11/3684; G06F 11/3688; G06F 11/3696
See application file for complete search history.

(56) References Cited

U.S. PATENT DOCUMENTS

| | | | |
|---|---|---|---|
| 2009/0055698 A1* | 2/2009 | Resnick | G11C 29/16 714/733 |
| 2016/0371181 A1* | 12/2016 | Garvey | G06F 12/0253 |
| 2017/0286258 A1* | 10/2017 | Coulthard | G06F 11/368 |
| 2018/0089071 A1* | 3/2018 | Keskitalo | G06F 11/3688 |
| 2019/0266074 A1* | 8/2019 | Copty | G06F 11/3676 |
| 2022/0253375 A1* | 8/2022 | Rivoir | G06F 11/3684 |
| 2023/0418734 A1* | 12/2023 | Aird | G06F 11/3688 |
| 2025/0004933 A1* | 1/2025 | Abedin | G06F 11/3688 |

* cited by examiner

*Primary Examiner* — Joseph O Schell
(74) *Attorney, Agent, or Firm* — Krishnendu Gupta; Lesley Leonessa (57) ABSTRACT

Methods, system, and non-transitory processor-readable storage medium for an Out of Memory test baseline system are provided herein. An example method includes executing a plurality of test cases on a system. A test score calculation module calculates a test case score for each of the executed test cases in a subset of the plurality of test cases. An Out of Memory (OOM) test baseline configuration system trains a machine learning system, using the subset test scores, to predict a baseline test score for an unexecuted test case. A test case score prediction module predicts the baseline test score for the unexecuted test case. A test case configuration tuning module tunes the unexecuted test case to determine a baseline configuration for the unexecuted test case, to identify OOM issues when the unexecuted test case is executed on a test system.

20 Claims, 6 Drawing Sheets

INTELLIGENT SCORE BASED OOM TEST BASELINE MECHANISM

FIELD

The field relates generally to optimizing Out of Memory baseline testing, and more particularly to optimizing Out of Memory baseline testing in information processing systems.

BACKGROUND

An "Out of memory" (OOM) status is an undesired state of computer operation in an information processing system. When an information process system has an OOM status, no additional memory can be allocated for use by programs or the operating system executing on the information processing system. In this scenario, the information processing system will be unable to load any additional programs, and any existing programs that attempt to load additional data into memory during execution will also be unable to execute correctly. Determining an Out of Memory baseline configuration for testing, therefore, is critical to the success of a software project.

SUMMARY

Illustrative embodiments provide techniques for implementing an Out of Memory test baseline system in a storage system. For example, illustrative embodiments execute a plurality of test cases on a system. A test score calculation module calculates a test case score for each of the executed test cases in a subset of the plurality of test cases. An Out of Memory (OOM) test baseline configuration system trains a machine learning system, using the subset test scores, to predict a baseline test score for an unexecuted test case. A test case score prediction module predicts the baseline test score for the unexecuted test case, where the test case score prediction module comprises the machine learning system. A test case configuration tuning module tunes the unexecuted test case to determine a baseline configuration for the unexecuted test case, to identify OOM issues when the unexecuted test case is executed on a test system. Other types of processing devices can be used in other embodiments. These and other illustrative embodiments include, without limitation, apparatus, systems, methods and processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing an Out of Memory test baseline system, which technique may be used to provide, among other things, Out of Memory test baseline configuration optimization by executing a plurality of test cases on a system. A test score calculation module calculates a test case score for each of the executed test cases in a subset of the plurality of test cases. An Out of Memory (OOM) test baseline configuration system trains a machine learning system, using the subset test scores, to predict a baseline test score for an unexecuted test case. A test case score prediction module predicts the baseline test score for the unexecuted test case, where the test case score prediction module comprises the machine learning system. A test case configuration tuning module tunes the unexecuted test case to determine a baseline configuration for the unexecuted test case, to identify OOM issues when the unexecuted test case is executed on a test system.

Testing for Out of Memory issues is a very important and difficult challenge in storage systems. The scenarios that trigger an OOM error are varied and can be difficult to simulate since the testing environment is complex with many processors running in parallel. Although various scenarios may be recreated, ultimately there are too many scenarios to recreate, and even then not all the scenarios may be identified. Simulating an unexpected OOM error has its challenges; if the case load is too low, the OOM error will not trigger, if the case load is too high, an expected OOM error will be triggered.

Conventional technologies for Out of Memory test baseline configuration do not have the means to determine the proper memory usage workload needed to trigger a valid OOM error. Conventional technologies use a variety of IO tools to simulate customers' workload to trigger an OOM error, and each IO tool may vary causing varying memory usage behaviors and different OOM baseline configurations. Conventional technologies do not provide effective baseline testing scenarios to produce valid OOM errors. Conventional technologies do not provide a way to determine the baseline configurations that produce valid OOM errors and address critical product issues, which, in turn, improves the quality of the information systems that are delivered to customers.

By contrast, in at least some implementations in accordance with the current technique as described herein, Out of Memory test baseline configurations are determined and optimized by executing a plurality of test cases on a system. A test score calculation module calculates a test case score for each of the executed test cases in a subset of the plurality of test cases. An Out of Memory (OOM) test baseline configuration system trains a machine learning system, using the subset test scores, to predict a baseline test score for an unexecuted test case. A test case score prediction module predicts the baseline test score for the unexecuted test case, where the test case score prediction module comprises the machine learning system. A test case configuration tuning module tunes the unexecuted test case to determine a baseline configuration for the unexecuted test case, to identify OOM issues when the unexecuted test case is executed on a test system.

Thus, a goal of the current technique is to provide a method and a system for providing an Out of Memory test baseline system that optimizes OOM testing by determining appropriate configurations. Another goal is to determine the proper memory usage workload needed to trigger a valid OOM error. Another goal is to provide effective baseline testing scenarios to produce valid OOM errors. Another goal is to determine the baseline configurations that produce valid OOM errors and address critical product issues.

In at least some implementations in accordance with the current technique described herein, the use of an Out of Memory test baseline system can provide one or more of the following advantages: optimizing OOM testing by determining appropriate configurations, determining the proper memory usage workload needed to trigger a valid OOM error, providing effective baseline testing scenarios to produce valid OOM errors, and determining the baseline configurations that produce valid OOM errors and address critical product issues.

In contrast to conventional technologies, in at least some implementations in accordance with the current technique as described herein, Out of Memory test baseline configuration is optimized by executing a plurality of test cases on a system. A test score calculation module calculates a test case score for each of the executed test cases in a subset of the plurality of test cases. An Out of Memory (OOM) test baseline configuration system trains a machine learning system, using the subset test scores, to predict a baseline test score for an unexecuted test case. A test case score prediction module predicts the baseline test score for the unexecuted test case, where the test case score prediction module comprises the machine learning system. A test case configuration tuning module tunes the unexecuted test case to determine a baseline configuration for the unexecuted test case, to identify OOM issues when the unexecuted test case is executed on a test system.

In an example embodiment of the current technique, the baseline test score for the unexecuted test measures the unexecuted test case's ability to trigger an OOM error.

In an example embodiment of the current technique, the test case evaluation module evaluates each of the plurality of test cases to identify similarities among the test cases in the plurality of test cases.

In an example embodiment of the current technique, the test case evaluation module performs multidimensional scaling to visualize the similarities among the test cases in the plurality of test cases.

In an example embodiment of the current technique, the test case evaluation module performs multidimensional scaling to visualize the similarities among the test cases in the plurality of test cases and the unexecuted test case.

In an example embodiment of the current technique, the test score calculation module categorizes the plurality of test cases into a plurality of subsets of test cases, where the plurality of subsets of test cases comprises the subset of the plurality of test cases.

In an example embodiment of the current technique, the test score calculation module identifies a similarity between the unexecuted test case and the subset of the plurality of test cases.

In an example embodiment of the current technique, the test score calculation module clusters the plurality of test cases into the plurality of subsets using a mean-shift algorithm.

In an example embodiment of the current technique, the test score calculation module clusters the plurality of test cases and the unexecuted test case into the plurality of subsets using the mean-shift algorithm.

In an example embodiment of the current technique, the test score calculation module defines a plurality of OOM bug types, identifies a respective subset of OOM bug types associated with each of the subset of the plurality of test cases, calculates a bug type test score for each of the respective subsets of OOM bug types, and uses the bug type test scores to calculate the test case score for each of the respective executed test cases in the subset of the plurality of test cases.

In an example embodiment of the current technique, the Out of Memory test baseline system trains a machine learning model using a plurality of configuration sets, where each of the subset of test cases has a respective configuration set.

In an example embodiment of the current technique, the Out of Memory test baseline system trains a machine learning model using the test scores of the subset of test cases.

In an example embodiment of the current technique, the Out of Memory test baseline system selects the subset of test cases from a plurality of subsets of test cases due to a similarity between the subset of test cases and the unexecuted test case, where the plurality of test cases comprises the plurality of subsets of test cases.

In an example embodiment of the current technique, the test case configuration tuning module determines the baseline test score exceeds a threshold, and reduces a case load associated with the unexecuted test case.

In an example embodiment of the current technique, the test case configuration tuning module determines the baseline test score does not meet a threshold, and increases a case load associated with the unexecuted test case.

In an example embodiment of the current technique, test case configuration tuning module determines the baseline test score meets a threshold, and identifies the baseline configuration for the unexecuted test case.

In an example embodiment of the current technique, the test case configuration tuning module iteratively predicts the baseline test score for the unexecuted test case after adjusting a case load associated with the unexecuted test case, until the baseline test score meets a threshold.

Figure 1:
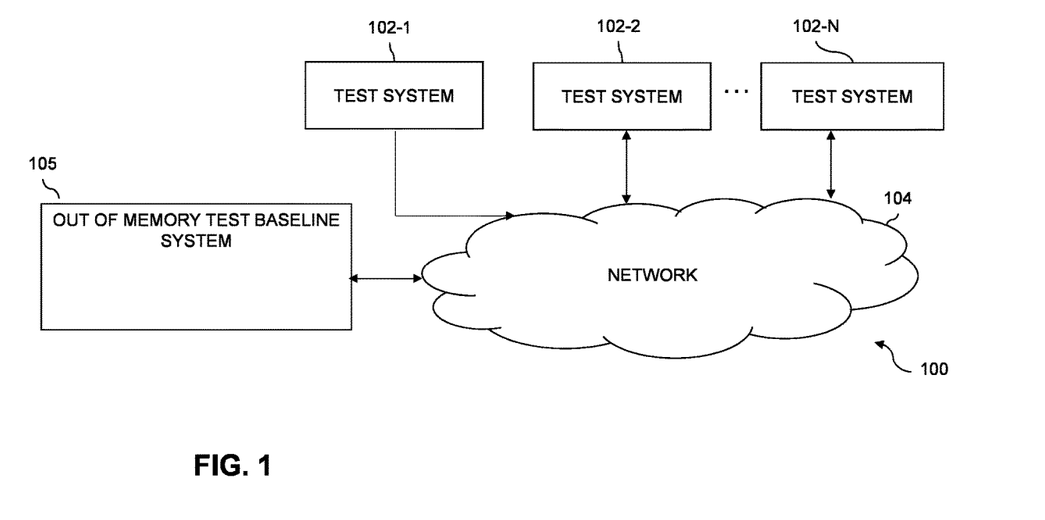
FIG. 1 shows an information processing system including an Out of Memory test baseline system in an illustrative embodiment.

FIG. 1 shows a computer network (also referred to herein as an information processing system) 100 configured in accordance with an illustrative embodiment. The computer network 100 comprises test systems 102-N. The test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an Out of Memory test baseline system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the Out of Memory test baseline system 105 are one or more input-output devices, which illustratively comprise keyboards, displays or other types of input-output devices in any combination. Such input-output devices can be used, for example, to support one or more user interfaces to the Out of Memory test baseline system 105, as well as to support communication between the Out of Memory test baseline system 105 and other related systems and devices not explicitly shown. For example, a dashboard may be provided for a user to view a progression of the execution of the Out of Memory test baseline system 105. One or more input-output devices may also be associated with any of the test systems 102-N.

Additionally, the Out of Memory test baseline system 105 in the FIG. 1 embodiment is assumed to be implemented using at least one processing device. Each such processing device generally comprises at least one processor and an associated memory, and implements one or more functional modules for controlling certain features of the Out of Memory test baseline system 105.

More particularly, the Out of Memory test baseline system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the Out of Memory test baseline system 105 to communicate over the network 104 with the test systems 102-N and illustratively comprises one or more conventional transceivers.

An Out of Memory test baseline system 105 may be implemented at least in part in the form of software that is stored in memory and executed by a processor, and may reside in any processing device. The Out of Memory test baseline system 105 may be a standalone plugin that may be included within a processing device.

It is to be understood that the particular set of elements shown in FIG. 1 for Out of Memory test baseline system 105 involving the test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the Out of Memory test baseline system 105 and the test systems 102-N can be on and/or part of the same processing platform.

An exemplary process of Out of Memory test baseline system 105 in computer network 100 will be described in more detail with reference to, for example, the flow diagram of FIG. 4.

Figure 2:
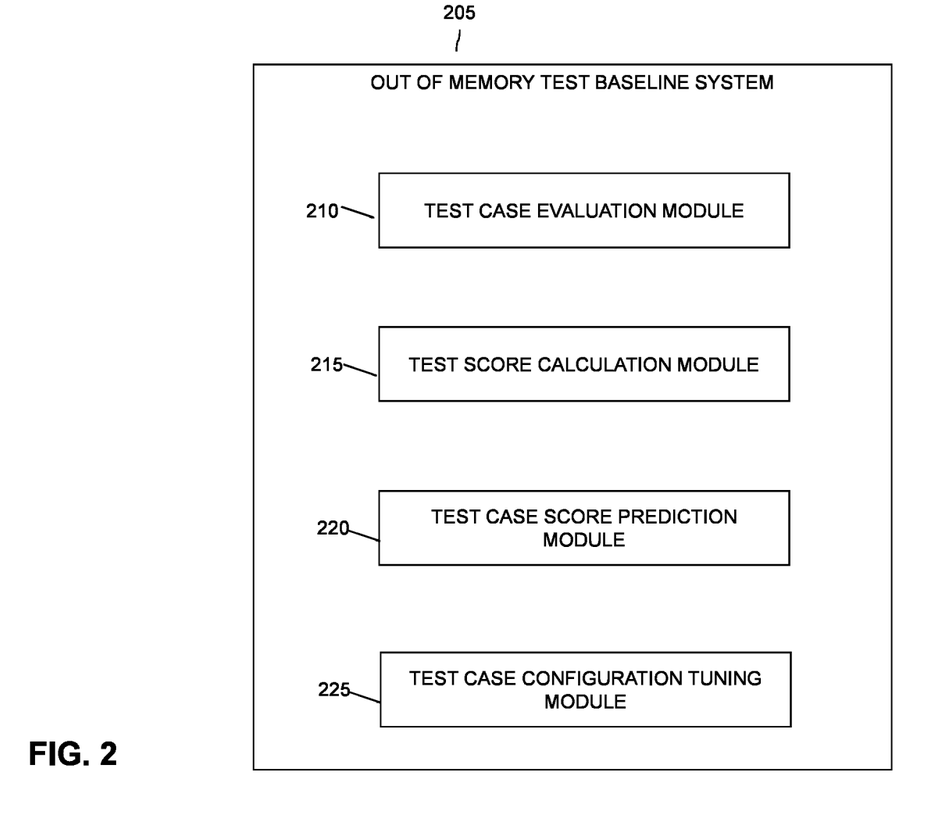
FIG. 2 shows an example of an Out of Memory test baseline system in an illustrative embodiment.

Referring now to FIG. 2, this figure shows an example of an Out of Memory test baseline system 105 in an illustrative embodiment.

The Out of Memory test baseline system comprises a test case evaluation module 210, a test score calculation module 215, a test case score prediction module 220, and a test case configuration tuning module 225. In an example embodiment, when a new unexecuted test case becomes available, the Out of Memory test baseline system 105 collects the plurality of test cases, and determines the testing history of the plurality of test cases (meaning the OOM targeted test cases and the OOM bug correlated test cases). The test case evaluation module 210 evaluates each of a plurality of executed test cases to identify similarity among the executed test cases as well as an unexecuted test case. The test score calculation module 215 categorizes the plurality of test cases into a plurality of subsets of test cases, and then identifies a similarity between the unexecuted test case and the subset of the plurality of test cases. The test score calculation module 215 categorizes the plurality of test cases and the unexecuted test case using a multidimensional scaling and mean shift clustering algorithms. The test score calculation module 215 calculates a test case score for each of the executed test cases in the subset of the plurality of test cases. The Out of Memory test baseline system 105 trains a machine learning model using the test case scores previously calculated for each of the executed test cases in the subset of the plurality of test cases. The test case score prediction module 220 uses the trained machine learning module to predict a baseline score for the unexecuted test case. The test case configuration tuning module 225 tunes the unexecuted test case to determine a baseline configuration for the unexecuted test case to identify OOM issues when the unexecuted test case is executed on a test system. For example, the test case configuration tuning module 225 tunes the unexecuted test case according to the predicted baseline test score. If the baseline test score is greater than zero, the recommendation is to reduce the caseload. The test case score prediction module 220 then predicts (again) the unexecuted test case's baseline score. If the baseline test score is less than zero, the recommendation is to increase the caseload. The test case score prediction module 220 then predicts (again) the unexecuted test case's baseline score. If the baseline test score is equals zero, the configuration of the incoming unexecuted test score has been tuned to an expected baseline score. In an example embodiment, the Out of Memory test baseline system 105 tunes the caseload, and in doing so, determines what combination of configuration items ideally should be. For example, a first combination of configuration items might be "concurrent thread count=1000, concurrent users count=1000, shared folder number=10, interface link number=10; IP range number=256, IO size=8K, IO duration=24 h, array model=unity 380", whereas a second combination of configuration items might be "concurrent thread count=500, concurrent users count=500, shared folder number=100, interface link number=10; IP range number=1024, IO size=8K, IO duration=24 h, array model=unity 380". In practice, a tester may prefer to keep, for example, the shared folder number to a minimum, or current user count to 500 or less, but may prefer to tune/adjust the concurrent thread count since it is easier to tune within a real test environment.

Figure 3:
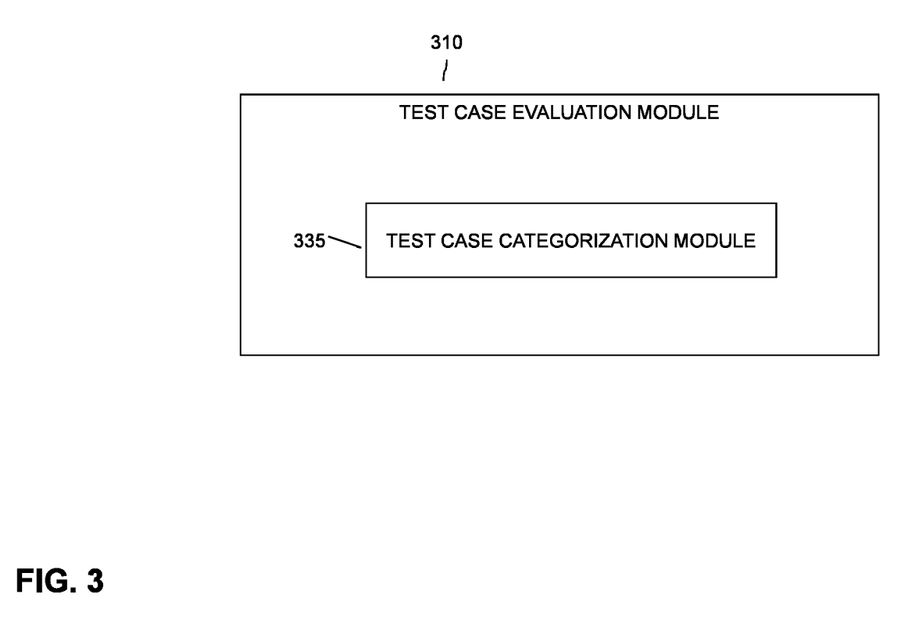
FIG. 3 shows an example of a test case evaluation module in an illustrative embodiment.

Referring now to FIG. 3, this figure shows an example of a test case evaluation module 210 in an illustrative embodiment. The test case evaluation module 210 comprises the test case categorization module 335. The test case categorization module 335 categorizes the plurality of test cases into a plurality of subsets of test cases, as described below in FIG. 4.

Figure 4:
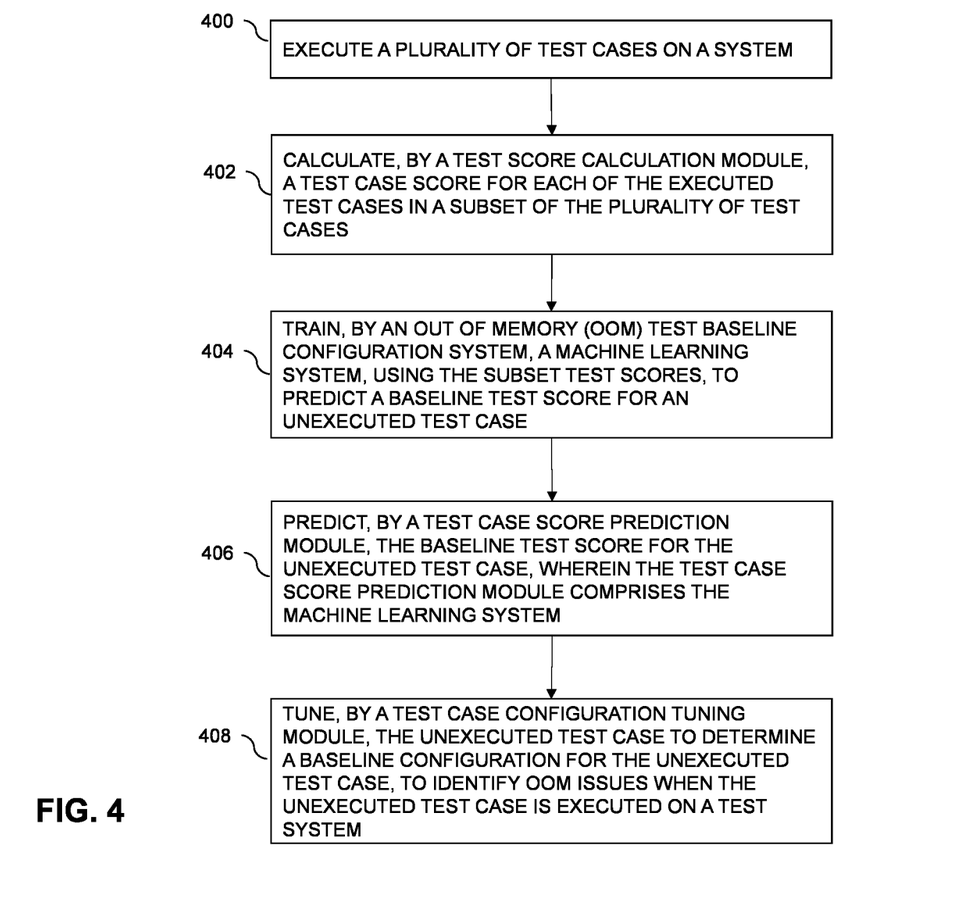
FIG. 4 shows a flow diagram of a process for an Out of Memory test baseline system in an illustrative embodiment.

FIG. 4 is a flow diagram of a process for execution of the Out of Memory test baseline system 205 in an illustrative embodiment. It is to be understood that this particular process is only an example, and additional or alternative processes can be carried out in other embodiments.

At 400, a plurality of test cases is executed on a test system 102-N. A test case may be executed on several different test systems 102-N, and/or several test cases may be executed on a single test system 102-1.

At 402, the test score calculation module 215 calculates a test case score for each of the executed test cases in a subset of the plurality of test cases. In an example embodiment, the test case categorization module 335 categorizes the plurality of test cases into a plurality of subsets of test cases, where the plurality of subsets of test cases comprises the subset of the plurality of test cases. In an example embodiment, the test case evaluation module 210 identifies a similarity between the unexecuted test case and the subset of the plurality of test cases.

In an example embodiment, the test case evaluation module 210 evaluates each of the plurality of test cases to identify similarities among the test cases in the plurality of test cases. For example, different test cases may have different test point coverage, and may use differing input/output (IO) tools to simulate users' business requirements on different platform models. For example:

Protocol type: SMB, NFS, vVol, iscsi, Fiber channel, SMIS, VASA provider, etc.
IO simulation tool: IOX, vjtree, FIO, vdbench, LDX, etc.
Application type: exchange, OrcalDB, SQL server, etc.
Platform model: Unity 680, Unity 380, Powerstore Riptide, Powerstore EXS, etc.
Fast cache config: enabled with 2 drives, enabled with 4 drives, disabled, etc.
Test case feature coverage: for example the specified feature that is covered by the test case.

The test cases attributes, such as those listed above, are varied and large. In an example embodiment, the test case evaluation module 210 performs multidimensional scaling to visualize the similarities among the test cases in the plurality of test cases. In another example embodiment, the test case evaluation module 210 performs multidimensional scaling to visualize the similarities among the test cases in the plurality of test cases and the unexecuted test case.

In an example embodiment, there are N attributes associated with a given test case. These attributes may be represented as $X=\{x_1, x_2, \ldots, x_N\}$ for test case X. A dimensional reduction may be performed by a multidimensional scaling (MDS) algorithm. MDS is a means of visualizing the level of similarity of individual tests cases of a dataset of test cases (in this scenario, the plurality of test cases). In an example embodiment, there are a total of M test cases, where each test case is defined with N attributes: $X_1, X_2, \ldots, X_M$.

The distance matrix of the test case attributes can be defined as:

$$D = \begin{pmatrix} d_{11} & \cdots & d_{1N} \\ \vdots & \ddots & \vdots \\ d_{M1} & \cdots & d_{MN} \end{pmatrix},$$

Where $d_{ij}$ represents the Euclidean distance between $i^{th}$ and $j^{th}$ attributes,
and $d_{ij}=\|x_i-x_j\|$. Assume after MDS algorithm, the attributes can be reduced to L dimension.

In an example embodiment, the test case categorization module 335 clusters the plurality of test cases into the plurality of subsets using a mean-shift algorithm. In another example embodiment, the test case categorization module 335 clusters the plurality of test cases and the unexecuted test case into the plurality of subsets using the mean-shift algorithm. The mean-shift algorithm classifies the test cases into clusters without requiring the number of clusters to be specified in advance. The number of clusters is determined by the algorithm with respect to the data provided, in this case the plurality of test cases. Upon completion of the mean-shift algorithm, the plurality of test cases and the unexecuted test case are classified into different categories according to their similarities. In an example embodiment, the Out of Memory test baseline system 105 first performs the MDS algorithm, and then performs the mean-shift algorithm.

In an example embodiment, the test case categorization module 335 selects the subset of test cases from a plurality of subsets of test cases due to a similarity between the subset of test cases and the unexecuted test case, where the plurality of test cases comprises the plurality of subsets of test cases.

In an example embodiment, the test score calculation module 215 learns the test case's bug handling history to evaluate the test case's ability to identify valid OOM issues. The test score calculation module 215 defines a plurality of OOM bug types. For example, a test case that is linked with a valid OOM bus is a good test case, and its configuration may be used as a baseline. A test case that is linked with an invalid OOM bug and is recoverable may have a configuration that is close to baseline, but the test case might have too heavy of a case load. A test case that is linked with an invalid OOM bug and is unrecoverable may have a configuration that is not close to baseline, and the test case might have too heavy of a case load. A test case that is linked with a non OOM valid bug may have the potential to find a valid OOM issue, and its configuration may be enhanced to be close to baseline. A test case that is not linked to any valid bug may have a case load that is too light to have the potential to find an OOM issue during test case execution. In an example embodiment, a case load is reflected by a plurality of configuration parameters.

In an example embodiment, each OOM bug type has a score. A score of zero means the configuration is at baseline while a positive score means the configuration exceeds the baseline, and a negative score means the configuration is lower than baseline.

| Bug type | Score of bug $S_{bug}$ |
|---|---|
| Valid OOM bug | 0 |
| Invalid OOM bug and recoverable | +3 |
| Invalid OOM bug and unrecoverable | +5 |
| Non-OOM valid bug | −3 |
| No valid bugs | −5 |

In an example embodiment, the test score calculation module 215 identifies a respective subset of OOM bug types associated with each of the subset of the plurality of test cases, and calculates a bug type test score for each of the respective subsets of OOM bug types. For example, for a test case i, the test case score $S_{case\ i}$ may be calculated as:

$$S_{case\ i} = S_{baseline\ case} \pm \sqrt{\frac{1}{K} \cdot \sum_{k=1}^{K}(S_{bugk} - S_{baseline\ case})^2} = \pm \sqrt{\frac{1}{K} \cdot \sum_{k=1}^{K}(S_{bug\ k})^2}$$

In an example embodiment, K is the number of test case bugs that are linked to test case i, $S_{baseline}$ is the score of a baseline test case (meaning it equals "0"), and "+" indicates a test case is linked with an invalid OOM bug, otherwise "−" is used in the equation. Thus, the test score calculation module 215 calculates the test case scores based on a detailed bug type analysis.

In an example embodiment, the test score calculation module 215 uses the bug type test scores to calculate the test case score for each of the respective executed test cases in the subset of the plurality of test cases. In an example embodiment, a test case may be linked with multiple bugs, and those bugs may be similar types or different types. An OOM targeted test case may have a positive or negative score. For example, a heavily loaded test case that is linked with invalid OOM bugs may not be able to trigger a valid non OOM bug because the test system on which the test case is executing would enter into an error state before triggering the valid non OOM bug. In an example embodiment, the test score calculation module 215 may calculate a test score of "0" if, for example, test case 1 is linked with only 1 valid OOM bug {0}, a test score of "−2.45", if, for example, test case 2 is linked with 1 valid OOM bug, and 2 non OOM valid bugs {0, −3, −3}, and a test score of "+4.12" if, for example, test case 3 is linked with 1 invalid recoverable OOM bug, and 1 invalid unrecoverable OOM bug {3, 5}

At 404, the Out of Memory (OOM) test baseline configuration system 105 trains a machine learning system, using the subset test scores, to predict a baseline test score for an unexecuted test case. In an example embodiment, the training sample dataset is the test cases' bug handling history. The training sample dataset represents the configuration set that is associated with the test case when the bugs occurred during execution of the test case. For example, the training sample dataset may contain tester defined OOM targeted test cases, and OOM bug correlated test cases. In an example embodiment, each test case has its detailed configuration set, for example, concurrent thread count, concurrent users count, shared folder number, interface link number, IP range number, IO size, IO duration, array model, etc. In an example embodiment, the training sample dataset may be formatted as:

| Case id | Input matrix | Score of case |
|---|---|---|
| Case 1 | {configuration set 1} | $S_{case1}$ |
| Case 2 | {configuration set 2} | $S_{case2}$ |
| ... | ... | ... |
| Case N | {configuration set N} | $S_{case3}$ |

In an example embodiment, the Out of Memory test baseline system 105 trains a machine learning model using a plurality of configuration sets, where each of the subset of test cases has a respective configuration set. In an example embodiment, the Out of Memory test baseline system 105 trains a machine learning model using the test scores of the subset of test cases. In an example embodiment, the Out of Memory test baseline system 105 trains the machine learning model using both the configuration set and the test scores of the subset of test cases. In an example embodiment, the Out of Memory test baseline system 105 uses the training sample dataset to train the machine learning model to obtain a suitable weight co, and to further use the machine learning model to predict the test case score for incoming unexecuted test cases.

At 406, the test case score prediction module 220 predicts the baseline test score for the unexecuted test case, where the test case score prediction module comprises the machine learning system.

At 408, the test case configuration tuning module 225 tunes the unexecuted test case to determine a baseline configuration for the unexecuted test case, to identify OOM issues when the unexecuted test case is executed on a test system. In other words, the test case configuration tuning module 225 tunes various configuration items or configuration parameters associated with the unexecuted test case to optimize triggering valid OOM errors. In an example embodiment, the baseline test score for the unexecuted test measures the unexecuted test case's ability to trigger an OOM error. In an example embodiment, the test case configuration tuning module 225 determines the baseline test score exceeds a threshold, and reduces the case load associated with the unexecuted test case. In an example embodiment, the test case configuration tuning module 225 determines the baseline test score does not meet a threshold, and increases the case load associated with the unexecuted test case. In an example embodiment, the test case configuration tuning module 225 determines the baseline test score meets a threshold, and identifies the baseline configuration for the unexecuted test case. In an example embodiment, the test case configuration tuning module 225 iteratively predicts the baseline test score for the unexecuted test case after adjusting a case load associated with the unexecuted test case, until the baseline test score meets a threshold.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly optimize OOM testing by determining appropriate configurations needed to trigger a valid OOM error. These and other embodiments can effectively improve OOM testing relative to conventional approaches. For example, embodiments disclosed herein determine the proper memory usage workload needed to trigger a valid OOM error. Embodiments disclosed herein provide effective baseline testing scenarios to produce valid OOM errors. Embodiments disclosed herein determine the baseline configurations that produce valid OOM errors and address critical product issues. Embodiments disclosed herein provide a system that is easily scaled with regard to test systems and test cases associated with storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of the information processing system 100, these platforms may also be used to implement at least portions of other information processing systems in other embodiments.

Figure 5:
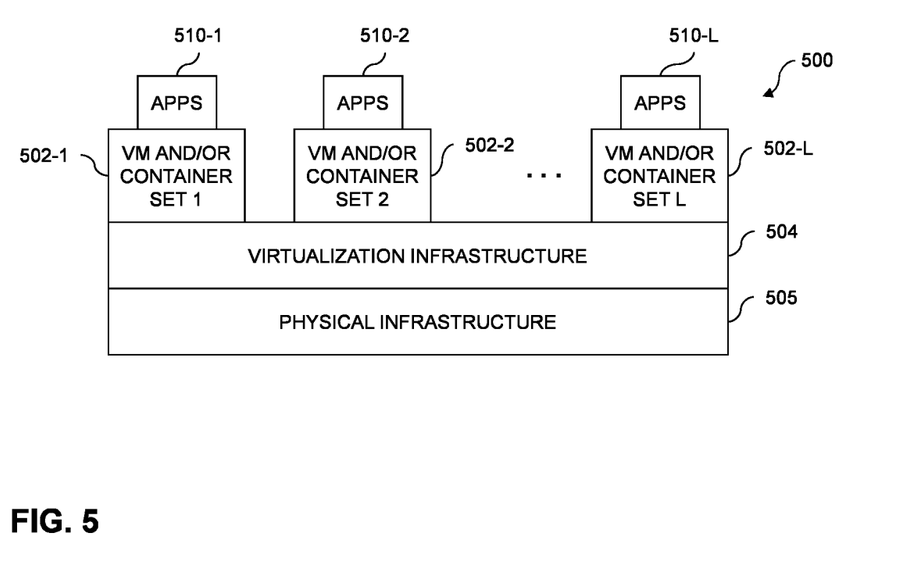
FIGS. 5 and 6 show examples of processing platforms that may be utilized to implement at least a portion of an Out of Memory test baseline system embodiments.
Figure 6:
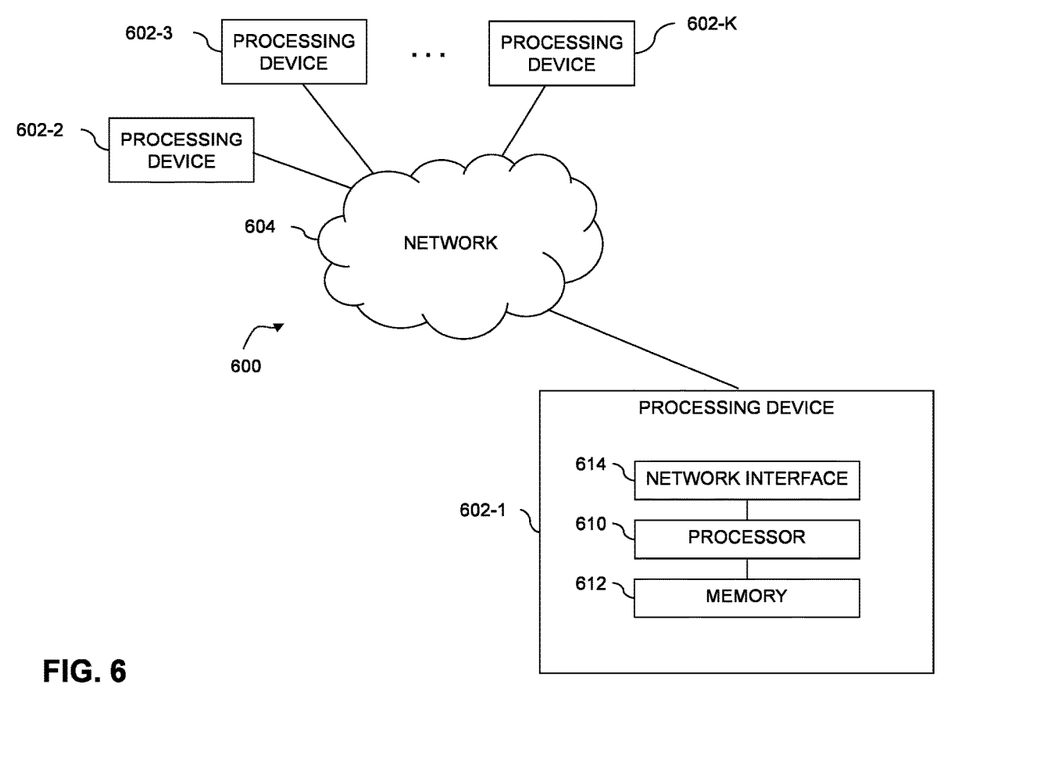

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of the information processing system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

executing a plurality of test cases on a system;

calculating, by a test score calculation module, a test case score for each of the executed test cases in a subset of the plurality of test cases;

training, by an Out of Memory (OOM) test baseline configuration system, a machine learning system, using the subset test scores, to predict a baseline test score for an unexecuted test case;

predicting, by a test case score prediction module, the baseline test score for the unexecuted test case by analyzing feature vectors of the unexecuted test case using the trained machine learning system, wherein the test case score prediction module comprises the machine learning system;

tuning, by a test case configuration tuning module, the unexecuted test case on a test system to determine a baseline configuration for the unexecuted test case, to identify OOM issues when the unexecuted test case is executed on the test system; and determining a memory usage workload that triggers an OOM error when the unexecuted test case is executed on the test system, wherein the method is implemented by at least one processing device comprising a processor coupled to a memory.

2. The method of claim 1 wherein the baseline test score for the unexecuted test measures the unexecuted test case's ability to trigger the OOM error.

3. The method of claim 1 wherein calculating, by the test score calculation module, the test case score for each of the executed test cases in the subset of the plurality of test cases comprises:
   evaluating, by a test case evaluation module, each of the plurality of test cases to identify similarities among the test cases in the plurality of test cases.

4. The method of claim 3 wherein evaluating, by the test case evaluation module, each of the plurality of test cases to identify the similarities among the test cases in the plurality of test cases comprises:
   performing multidimensional scaling to visualize the similarities among the test cases in the plurality of test cases.

5. The method of claim 4 further comprising:
   performing multidimensional scaling to visualize the similarities among the test cases in the plurality of test cases and the unexecuted test case.

6. The method of claim 1 wherein calculating, by the test score calculation module, the test case score for each of the executed test cases in the subset of the plurality of test cases comprises:
   categorizing the plurality of test cases into a plurality of subsets of test cases, wherein the plurality of subsets of test cases comprises the subset of the plurality of test cases.

7. The method of claim 6 further comprising:
   identifying a similarity between the unexecuted test case and the subset of the plurality of test cases.

8. The method of claim 6 wherein categorizing the plurality of test cases into the plurality of subsets of test cases comprises:
   clustering the plurality of test cases into the plurality of subsets using a mean-shift algorithm.

9. The method of claim 8 further comprising:
   clustering the plurality of test cases and the unexecuted test case into the plurality of subsets using the mean-shift algorithm.

10. The method of claim 1 wherein calculating, by the test score calculation module, the test case score for each of the executed test cases in the subset of the plurality of test cases comprises:
    selecting the subset of test cases from a plurality of subsets of test cases due to a similarity between the subset of test cases and the unexecuted test case, wherein the plurality of test cases comprises the plurality of subsets of test cases.

11. The method of claim 1 wherein calculating, by the test score calculation module, the test case score for each of the executed test cases in the subset of the plurality of test cases comprises:
    defining a plurality of OOM bug types;
    identifying a respective subset of OOM bug types associated with each of the subset of the plurality of test cases;
    calculating a bug type test score for each of the respective subsets of OOM bug types; and
    using the bug type test scores to calculate the test case score for each of the respective executed test cases in the subset of the plurality of test cases.

12. The method of claim 1 wherein training, by the Out of Memory (OOM) test baseline configuration system, the machine learning system comprises:
    training a machine learning model using a plurality of configuration sets, wherein each of the subset of test cases has a respective configuration set.

13. The method of claim 1 wherein training, by the Out of Memory (OOM) test baseline configuration system, the machine learning system comprises:
    training a machine learning model using the test scores of the subset of test cases.

14. The method of claim 1 wherein tuning, by the test case configuration tuning module, the unexecuted test case comprises:
    determining the baseline test score exceeds a threshold; and
    reducing a case load associated with the unexecuted test case.

15. The method of claim 1 wherein tuning, by the test case configuration tuning module, the unexecuted test case comprises:
    determining the baseline test score does not meet a threshold; and
    increasing a case load associated with the unexecuted test case.

16. The method of claim 1 wherein tuning, by the test case configuration tuning module, the unexecuted test case comprises:
    determining the baseline test score meets a threshold; and
    identifying the baseline configuration for the unexecuted test case.

17. The method of claim 1 wherein tuning, by the test case configuration tuning module, the unexecuted test case comprises:
    iteratively predicting, by the test case score prediction module, the baseline test score for the unexecuted test case after adjusting a case load associated with the unexecuted test case, until the baseline test score meets a threshold.

18. A system comprising:
    at least one processing device comprising a processor coupled to a memory;
    the at least one processing device being configured:
      to execute a plurality of test cases on a system;
      to calculate, by a test score calculation module, a test case score for each of the executed test cases in a subset of the plurality of test cases;
      to train, by an Out of Memory (OOM) test baseline configuration system, a machine learning system, using the subset test scores, to predict a baseline test score for an unexecuted test case;
      to predict, by a test case score prediction module, the baseline test score for the unexecuted test case, wherein the test case score prediction module comprises the machine learning system; and
      to tune, by a test case configuration tuning module, the unexecuted test case on a test system to determine a baseline configuration for the unexecuted test case, to identify OOM issues when the unexecuted test case is executed on the test system; and
      to determine a memory usage workload that triggers an OOM error when the unexecuted test case is executed on the test system.

19. The system of claim 18 further configured:
    to iteratively predict, by the test case score prediction module, the baseline test score for the unexecuted test case after adjusting a case load associated with the unexecuted test case, until the baseline test score meets a threshold.

20. A computer program product comprising a non-transitory processor-readable storage medium having stored therein program code of one or more software programs, wherein the program code when executed by at least one processing device causes said at least one processing device:
- to execute a plurality of test cases on a system;
- to calculate, by a test score calculation module, a test case score for each of the executed test cases in a subset of the plurality of test cases;
- to train, by an Out of Memory (OOM) test baseline configuration system, a machine learning system, using the subset test scores, to predict a baseline test score for an unexecuted test case;
- to predict, by a test case score prediction module, the baseline test score for the unexecuted test case, wherein the test case score prediction module comprises the machine learning system; and
- to tune, by a test case configuration tuning module, the unexecuted test case on a test system to determine a baseline configuration for the unexecuted test case, to identify OOM issues when the unexecuted test case is executed on the test system; and
- to determine a memory usage workload that triggers an OOM error when the unexecuted test case is executed on the test system.

* * * * *